United States Patent
Moustafa et al.

(10) Patent No.: US 11,762,451 B2
(45) Date of Patent: Sep. 19, 2023

(54) METHODS AND APPARATUS TO ADD COMMON SENSE REASONING TO ARTIFICIAL INTELLIGENCE IN THE CONTEXT OF HUMAN MACHINE INTERFACES

(71) Applicant: Intel Corporation, Santa Clara, CA (US)

(72) Inventors: Hassnaa Moustafa, Sunnyvale, CA (US); Rita H. Wouhaybi, Portland, OR (US); Nadine L. Dabby, Palo Alto, CA (US); Chaitanya Sreerama, Hillsboro, OR (US); Shekoufeh Qawami, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 1255 days.

(21) Appl. No.: 16/147,663

(22) Filed: Sep. 29, 2018

(65) Prior Publication Data

US 2019/0050686 A1  Feb. 14, 2019

(51) Int. Cl.
*G06F 15/00* (2006.01)
*G06F 3/01* (2006.01)
(Continued)

(52) U.S. Cl.
CPC ............. *G06F 3/011* (2013.01); *G06F 3/017* (2013.01); *G06F 18/2148* (2023.01);
(Continued)

(58) Field of Classification Search
CPC . G06F 3/00; G06F 16/00; G06F 3/011; G06F 3/017; G06F 3/016; G06F 40/20;
(Continued)

(56) References Cited

U.S. PATENT DOCUMENTS

2018/0046710 A1* 2/2018 Raanani ................. G06V 20/46
2018/0329998 A1* 11/2018 Thomson ......... H04N 21/41407
(Continued)

OTHER PUBLICATIONS

S. Werner, L. Masing, F. Lesniak and J. Becker, "Software-in-the-Loop simulation of embedded control applications based on Virtual Platforms," 2015 25th International Conference on Field Programmable Logic and Applications (FPL), 2015, pp. 1-8, doi: 10.1109/FPL.2015.7294020. (Year: 2015).*

*Primary Examiner* — Michael Ortiz-Sanchez
(74) *Attorney, Agent, or Firm* — Hanley, Flight & Zimmerman, LLC

(57) ABSTRACT

Methods, apparatus, systems and articles of manufacture are disclosed to add common sense to a human machine interface. Disclosed examples include a human machine interface system that having an actuator to cause artificial intelligence to execute in a virtual execution environment to generate a virtual response to a user input. The system also includes a virtual consequence evaluator to evaluate a virtual consequence that follows from the virtual response, the virtual consequence generated by executing a model of human interactions, and an output device controller to cause an output device to perform a non-virtual response to the user input when the virtual consequence evaluator evaluates the virtual consequence as positive.

17 Claims, 8 Drawing Sheets

(51) Int. Cl.
   *G06N 5/00*      (2023.01)
   *G06N 20/00*     (2019.01)
   *G06F 18/21*     (2023.01)
   *G06F 18/40*     (2023.01)
   *G06F 18/214*    (2023.01)
   *G06V 10/94*     (2022.01)
   *G10L 15/22*     (2006.01)
   *G05B 13/04*     (2006.01)
   *G06V 20/40*     (2022.01)

(52) U.S. Cl.
   CPC .......... *G06F 18/2178* (2023.01); *G06F 18/40* (2023.01); *G06N 5/00* (2013.01); *G06N 20/00* (2019.01); *G06V 10/945* (2022.01); *G05B 13/04* (2013.01); *G05B 2219/42114* (2013.01); *G06V 20/41* (2022.01); *G10L 15/22* (2013.01); *G10L 2015/223* (2013.01)

(58) Field of Classification Search
   CPC .... G06F 18/20; G06F 18/2148; G06F 18/217; G06F 18/2178; G06F 18/2185; G10L 15/22; G10L 2015/221; G10L 2015/223; G10L 2015/225; G10L 19/00; G10L 21/00; G10L 15/28; G10L 15/26; G10L 15/00; G10L 25/00; G06N 20/00; G06N 5/00; G06N 5/04; G06V 10/82; G06V 20/00; G06V 20/41; G06V 20/40; G06V 20/44; G06V 20/49; G05B 13/04; G05B 2219/00; G05B 2219/42114; G05B 13/02; G05B 13/048; G06K 9/00; G06K 9/62; G06K 9/6253; G06K 9/6257; G06K 9/6256; G06K 9/6217; G06K 9/6263
   See application file for complete search history.

(56) References Cited

U.S. PATENT DOCUMENTS

2019/0303759 A1* 10/2019 Farabet .................. G06F 9/455
2019/0304157 A1* 10/2019 Amer ..................... G06V 20/41

* cited by examiner

METHODS AND APPARATUS TO ADD COMMON SENSE REASONING TO ARTIFICIAL INTELLIGENCE IN THE CONTEXT OF HUMAN MACHINE INTERFACES

FIELD OF THE DISCLOSURE

This disclosure relates generally to human machine interfaces, and, more particularly, to methods and apparatus to add common sense reasoning to artificial intelligence in the context of human machine interfaces.

BACKGROUND

In recent years, human machine interfaces are becoming more sophisticated with the advent of products like Alexa, Siri, Home Hub, Cortana, etc. Such human machine interfaces use natural language processing algorithms and gesture recognition algorithms to identify voice-based commands and gesture-based commands issued by humans. Artificial intelligence then determines an appropriate response to such commands. Many technological advances are being made to various aspects of such systems. For example, efforts are being made to: 1) increase the speed at which the artificial intelligence is trained to recognize and respond to user commands, 2) accommodate the large data sets required to support the artificial intelligence system, 3) increase the efficiency of the artificial intelligence system, etc.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
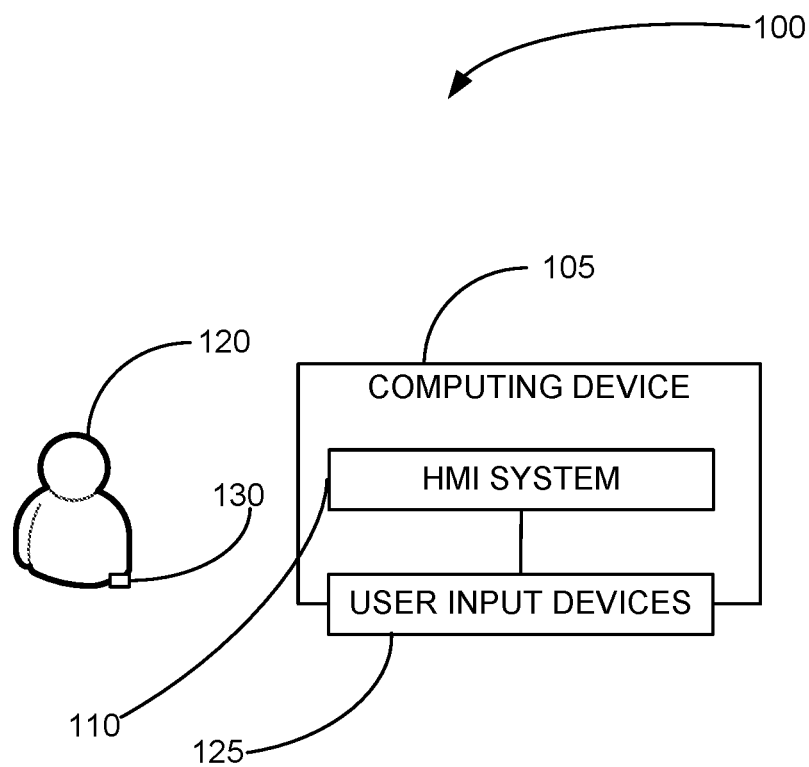
FIG. 1 is a block diagram of a computer system having an example human machine interface system in accordance with the teachings disclosed herein.

Human machine interfaces are becoming more user friendly and, thus, making technology more easily accessible to users. Recent advances include using microphones to capture the voice commands issued by a user as well as cameras to capture movement/gestures made by a user. In addition to capturing the voice commands and gestures, improved algorithms to process the captured voice and gesture information to identify commands are being developed. Artificial intelligence is often used to determine an appropriate response to a user command issued via voice or gesture. Current efforts to improve artificial intelligence algorithms are concentrated on the ability of algorithms to quickly and accurately identify gestures/voice commands. Efforts are also directed at improving (e.g., optimizing) the processing of the captured command information by dividing the processing between the cloud and network edge devices.

While important to the improvement of human machine interface technologies, such efforts fail to recognize that human machine interface technologies often provide responses to user commands that lack common sense. This lack of common sense causes interactions with HMI technology to be frustrating and can discourage a user from further interactions via an HMI technology. For example, human machine interface technologies sometimes attempt to respond to a command that has been issued by the user in jest or with sarcasm, when in fact, the user is not expecting and does not desire a response. Similarly, human machine interface technologies, when lacking contextual information, can generate responses that are inappropriate to a given user. Examples include speaking informally to a respected member of a user's family, speaking to a young child as though speaking to an adult, sending a message that says, "I love you," to a new acquaintance, responding to a user statement "I want to jump off a bridge," by navigating to a nearest bridge, giving a child instructions to take an action they are unqualified to take (e.g., drive a car, operate a stove, etc.), etc. Furthermore, currently, artificial intelligence is currently unable to distinguish between an ordinary/appropriate command and a command that in some circumstances might be ordinary and appropriate but is not appropriate in all circumstances. For example, asking a device to turn a light off or on may be appropriate in almost all situations. However, the same command becomes inappropriate when a child commands the device to turn the same light on and off repeatedly, simply for the novelty of it. As such, there is a need to inject an element of common sense reasoning into human machine interface technologies and the way devices with artificial intelligence ingest human machine interface commands and respond to the commands.

Methods, apparatus, systems, and articles of manufacture disclosed herein inject common sense reasoning into artificial intelligence (AI) based human machine interface technologies through the use of a virtual execution environment as well as "software in the loop" and "model in the loop testing" techniques. In some examples, the common sense reasoning disclosed herein, rather than having to learn only from past mistakes, includes an evaluator that can determine whether a machine-generated response (to a user command) is likely to be considered appropriate without having to actually perform the machine-generated response. In some examples, the common sense reasoning includes virtually generating a response to the user command in a model environment (simulated environment) created using human interaction data. The virtual response causes virtual consequences in the model environment. The common sense reasoning also includes evaluating the virtual consequences to determine whether the consequences are positive or negative. When the virtual consequences are positive, the artificial intelligence is permitted to execute the response to the user command in a non-virtual execution environment (in the real world). When the virtual consequences are negative, the artificial intelligence is not permitted to execute in response to the user command in a non-virtual execution environment.

As further disclosed herein, the response to the user command is generated in the virtual execution environment by using "software-in-the-loop" style testing of artificial intelligence. The virtual consequences of the response are generated by using "model-in-the-loop" style testing of the simulated environment. In some examples, the simulated/model environment represents a simulation of natural human interaction and is created using a library of written textual material of human interactions (e.g., books, screenplays, plays, messages, social media threads, etc.) and using a library of video material of human interactions (movies, television shows, online videos, etc.).

In some examples, artificial intelligence used to generate the response to the user command is able to learn from the virtual consequences generated in the simulated environment as well as from actual consequences generated in the real world. The actual consequences can be captured using any of a number of input devices associated with the human machine interface system. For example, a camera can record a user's facial expression that results from a response (to a user command) that is generated by the human machine interface system. The facial expression captured on the recording can then be analyzed by the human machine interface in an attempt to determine whether the facial expression corresponds to, for example, a smile (a positive consequence) or a frown (a negative consequence). The result of the analysis (positive or negative) is then used by the artificial intelligence when creating/generating responses to the same or similar user commands and/or questions in the future. Similarly, a result of analyses of any virtual consequences (positive or negative) generated by the model in the loop testing are used by the artificial intelligence when creating/generating responses to the same or similar user commands in the future. Software in the loop testing includes executing code (e.g., software) having algorithms or control strategies, within a modelling environment that can help prove or test the code. Model in the loop testing includes abstracting the behavior of a system in a manner that allows the operation of the system to be tested and simulated.

Thus, example systems, methods, apparatus, and articles of manufacture disclosed herein are able to use a form of common sense reasoning to determine whether a potential response to a user command and/or question is an appropriate and/or helpful response or is, instead, inappropriate and/or unhelpful. Based on the determination, disclosed systems, methods, apparatus and articles of manufacture are able to either respond to the user command and/or question or forego executing inappropriate and/or unhelpful responses thereby making the human machine interaction more helpful and user-friendly.

FIG. 1 is a block diagram of an example computing system 100 having an example computing device 105 that includes a human machine interface (HMI) system 110, a set of user input devices 125, and a wearable user input device 130. In some examples, a user 120 provides input (in the form of commands or questions) to the human machine interface system 110 via one or more of the input devices 125 and/or the wearable user input device 130. In some examples, the user input devices 125 include a camera, a motion sensor, a microphone, a keyboard, a button, etc.

Figure 2:
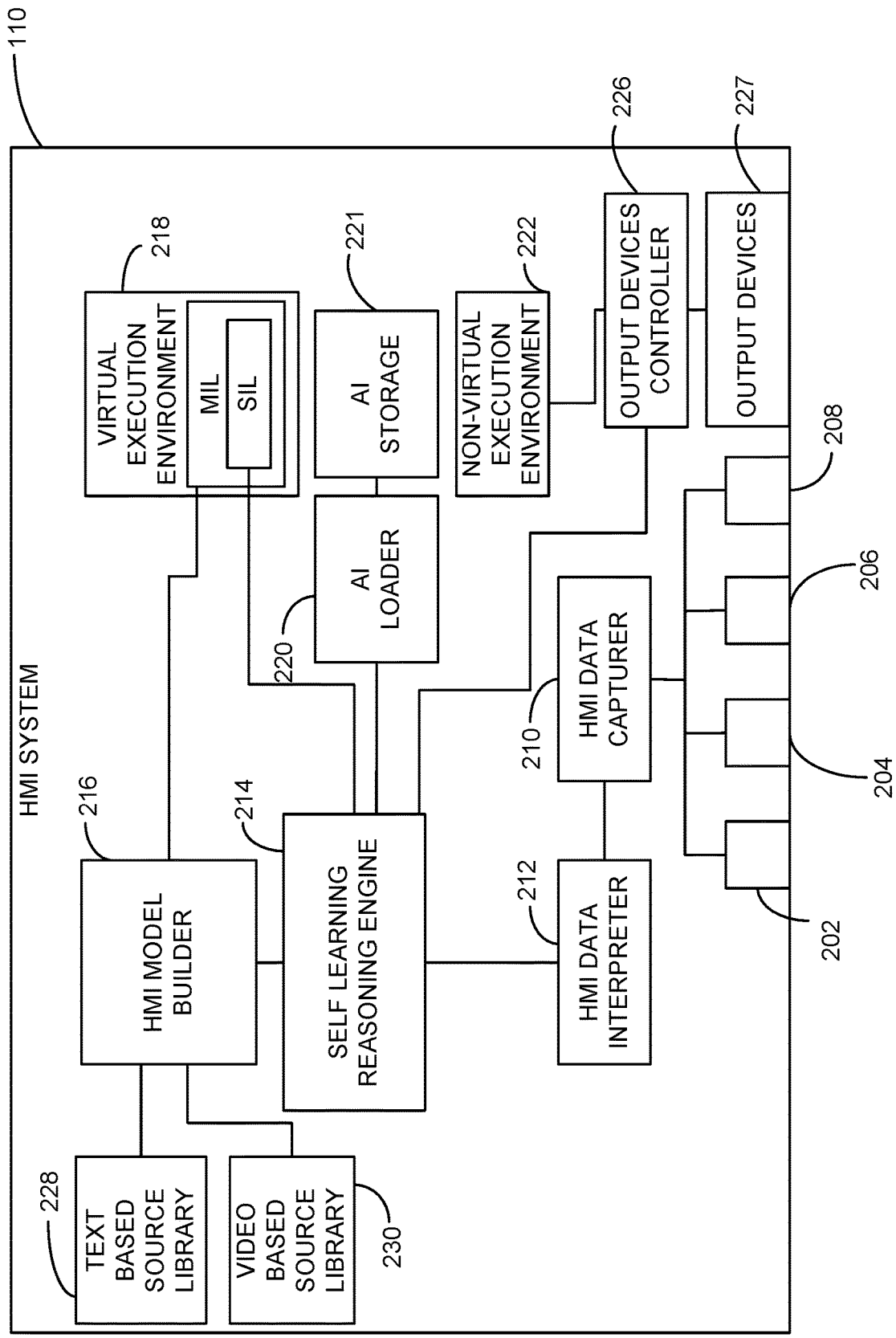
FIG. 2 is a block diagram of an example implementation of the human machine interface system of FIG. 1.

FIG. 2 is a block diagram of an example implementation of the human machine interface system 110 of FIG. 1. In some examples, the human machine interface system 110 includes an example still image and/or video sensor input port 202, an example keyboard input port 204, an example microphone input port 206, an example wearable input port 208, an example HMI data capturer 210, an example HMI data interpreter 212, an example self learning reasoning engine 214, an example HMI model builder 216, an example virtual execution environment 218, an example artificial intelligence (AI) software library 220, an example non-virtual execution environment 222, an example output devices controller 226, and example output devices 227. In some examples, the example HMI model builder 216 is coupled to an example text based source library 228 and is also coupled to an example video based source library 230.

Figure 3:
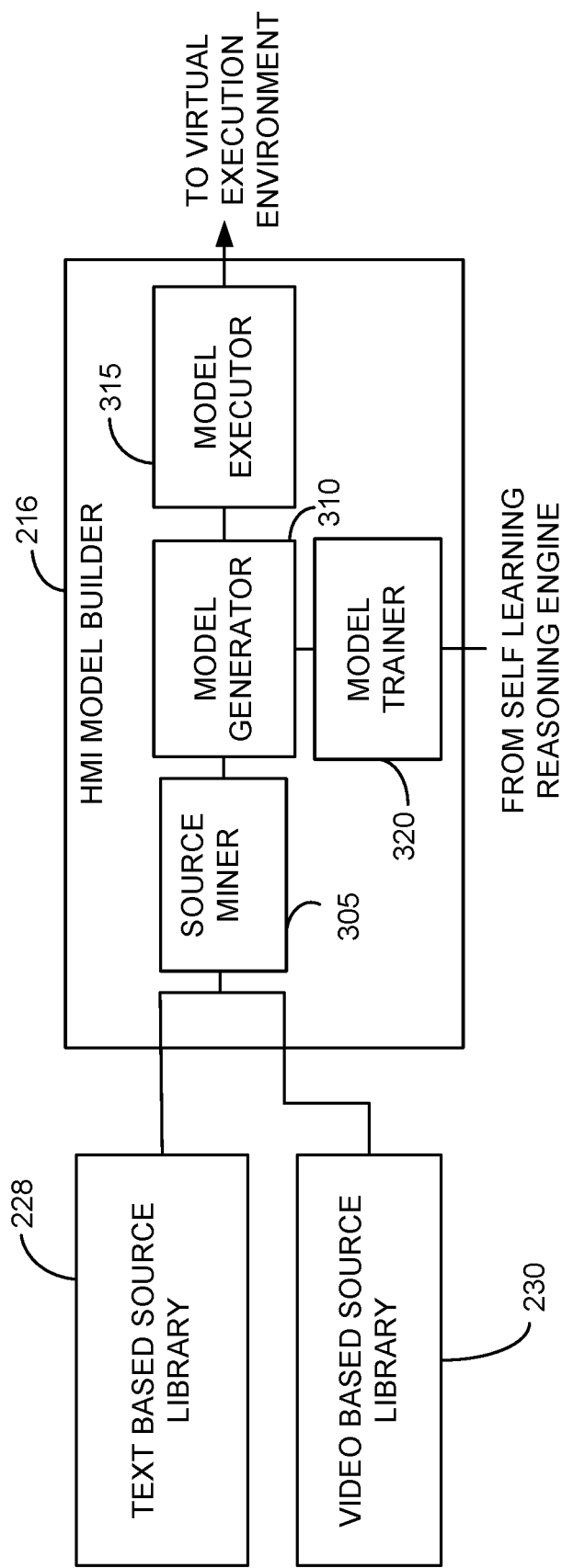
FIG. 3 is a block diagram of an example implementation of the example human machine interface (HMI) model builder of the human machine interface system of FIG. 1 and FIG. 2.

FIG. 3 is a block diagram of an example implementation of the HMI model builder 216 of FIG. 2. The example HMI builder 216 of FIG. 3 includes an example source miner 305, an example model generator 310, an example model executor 315, and an example model trainer 320. The source miner 305 mines information from the example text based source library and the example video based source library 230. The mined information is supplied to the example model generator 310 which uses the information to generate a model of human interactions. The model is used to create a simulated/virtual environment in which responses to user commands and user questions can be tested. The text based source library 228 can include textual sources including books, magazine articles, news articles, websites, screenplays, plays, etc. The source miner 305 mines the textual sources (using, for example, natural language processing techniques) for examples of human interactions and human dialog. When mining the dialog/interaction information, the source miner 305 also identifies contextual information about situations in which the dialogs/interactions occur. In some examples, the tone and emotional context of the dialog/interaction data is noted. Similarly, where possible, the ages of the characters/people, geographical locations, ethnicity, race, time period, relationship status, and any other relevant information is noted.

In some examples, the video based source library 230 includes television shows, movies, video clips, YouTube videos, etc. The source miner 305 mines the video based source library for dialog/interaction content by analyzing the video streams, the audio streams, closed captioning information (when available), etc. In some examples, metadata identifying whether the television show, move, video clip, etc., is a comedy, a drama, a children's television show, etc., is associated with the dialog/interaction information mined from the video/audio source. Similarly, the tone of the dialog/interaction included in the video content can be identified using the tone of the accompanying audio, the lighting of a scene included in the video stream, etc. In some examples, the source miner 305 uses keyword tags included in the video based content to assign a context to a dialog/interaction.

In some examples, the example model generator 310 (FIG. 3) analyzes the dialogs/interactions extracted from the text content and the video content to determine whether the dialog/interactions are intended to be humorous, sarcastic, snide, condescending, congratulatory, encouraging, silly, angry, etc. Additionally, the model generator 310 can use metadata extracted from online reviews of the text and/or the video content sources. In some examples, the source miner 305 and/or the model generator 310 tags the extracted dialogs/interactions to indicate whether the sources of the dialogs/interactions are associated with a particular genre (e.g., young adult, socially conservative, science fiction, suspense, etc.). In some examples, the model generator 310 is designed to give less weight to video content and/or text content that is designated as being comedic so that exaggerated scenes that are included for entertainment value are not used as a measure of appropriate/suitable human behavior. In some examples, the rating of a book and/or video and/or a critic's review of the book and/or video can be used to determine whether content is to be used as appropriate behavior to be modeled or a counterexample of appropriate behavior. In some examples, the ratings and/or critic reviews can be obtained by data scraping websites that include such information. In some examples, class room behavior and/or office behavior depicted in a book or a video can be used to model appropriate behavior. In some examples, the model generator is implemented using the Google Tensorflow, the Microsoft Machine Learning Studio Tool, or any other modeling tool suitable for generating the model environment in the virtual execution environment 218.

In some examples, the example model generator 310 supplies the model of human interactions to the example model executor 315. The model executor 315 causes the model to be executed using "model in the loop" style testing within the confines of the virtual execution environment 218 (see FIG. 2). The virtual execution environment is an environment that allows executing/running the AI with all the models in a virtual environment (i.e., simulated environment) to test the proper execution of the AI before the true execution of the AI (in the real world (e.g., a non-virtual environment)) and before the AI responds to a command in the real world.

Referring again to FIG. 2, in some examples, input received at any of the example still image and/or video sensor input port 202, the example keyboard input port 204, the example microphone input port 206, and the example wearable input port 208 is obtained by the example HMI data capturer 210. The HMI data capturer 210 supplies the received input to the example HMI data interpreter 212 which uses natural language parsing techniques, and/or gesture recognition to determine whether the received input includes a question or command. In some examples, a gesture or facial expression captured by the HMI data capturer 210 can be used by the HMI data interpreter 212 to determine whether a received input corresponds to a question or a command. For example, a user may raise a hand when asking a question or have a different posture or expression when asking a question. In some examples, a gesture and/or a facial expression that does not appear to match a vocal utterance can cause the HMI data interpreter 212 to indicate that the vocal utterance is suspicious in terms of it being legitimate. When the HMI data interpreter 212 determines the received input information includes a question or a command, information identifying the question/command is supplied to the example self learning reasoning engine 214. In some examples, the HMI data interpreter 212 determines that input received at the input devices is not to be treated as a command or a question but rather as feedback that can be used to train the AI and/or the model of human interactions. In some examples, training of the AI occurs in instances in which the AI is self learning.

Figure 4:
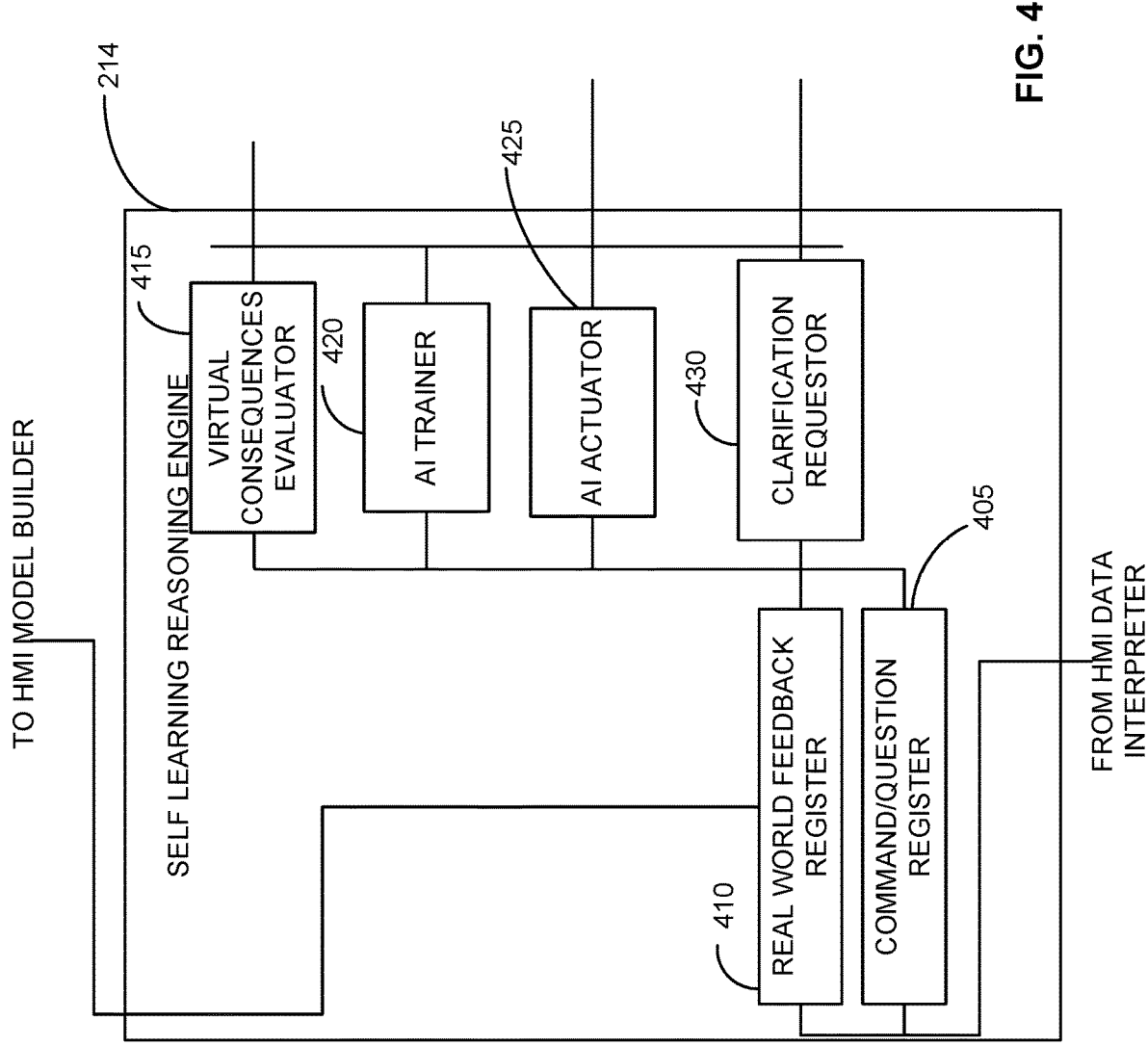
FIG. 4 is a block diagram of an example implementation of the example self learning reasoning engine of the human machine interface system of FIG. 1 and FIG. 2.

FIG. 4 is a block diagram of the example self learning reasoning engine 214 and includes an example command/question register 405, an example real world feedback register 410, an example virtual consequences evaluator 415, an example artificial intelligence (AI) trainer 420, an example AI actuator 425, and an example clarification requestor 430. In some examples, question/command information supplied to the self reasoning engine 214 by the example HMI interpreter is stored in the example command/question register 405. The AI actuator 425 responds to the placement of the question/command information in the question/command register 405 by causing the AI loader 220 (see FIG. 2) to load the AI stored in the AI storage 221 (see FIG. 2) into the virtual execution environment 218 (see FIG. 2).

In some such examples, the AI actuator 425 causes the AI to be executed in the virtual execution environment using a "software in the loop" testing technique. In addition, the AI actuator 425 supplies a copy of the question/command information contained in the question/command register 405 to be used as input by the AI during execution in the virtual execution environment 218. Referring also to FIG. 2, the AI actuator 425 causes the example AI to be executed within the simulated environment generated by the "model in the loop" testing of the model of human interactions. Responsive to the question/command information, the AI generates a virtual response. In some examples, the virtual response generated by the AI within the virtual execution environment 218 represents a manner in which the human machine interface system would respond to the question/command in the real world. Within the simulated environment (based on the model of human interaction generated by the HMI model builder 216) one or more virtual consequences that follow from the virtual response are identified. The virtual consequences are supplied to the self learning reasoning engine 214 which determines whether the virtual consequences are positive or negative.

When the example virtual consequences evaluator 415 determines the virtual consequences are positive, the AI actuator 425 causes the AI loader 220 (see FIG. 2) to load the AI stored in the AI storage 221 (see FIG. 2) into the non-virtual execution environment 222 (see FIG. 2). In addition, the AI actuator 425 causes the AI to be executed within the example non-virtual execution environment 222 and supplies the question/command stored in the question/command register 405 as input to the AI. The execution of the AI within the non-virtual execution environment causes a response to the question/command to be generated. The response is supplied to the example output device controller 226 which operates one or more output devices 227 to generate the response to the question/command in the real world.

By way of example, a user may issue a command (via vocal utterance or a gesture) to turn on a music device in an automobile. The user may then issue a command to turn the volume of the music up and to open all of the windows. In response, the AI actuator 425 causes the example AI to be executed within the simulated environment generated by the "model in the loop" testing of the model of human interactions. Responsive to the question/command information, the AI generates a virtual response. In some examples, the virtual response generated by executing the AI within the virtual execution environment 218 represents a manner in which the human machine interface system would respond to the question/command in the real world. Thus, for this example, within the simulated environment (based on the model of human interaction generated by the HMI model builder 216) the music would be turned on, the music volume would be turned up, and the windows of the automobile would be opened. In response, one or more virtual consequences that follow from the virtual response are identified. For example, the virtual consequences may include, the passengers complaining that the music is too loud or complaining that the air outside is too cold to have the windows down, or passers-by may complain that the music is too loud (e.g., is disturbing the peace). Such virtual consequences would be supplied to the self learning reasoning engine 214 which determines whether the virtual consequences are positive or negative. In this example, the consequences may be viewed as negative in which case the self learning reasoning engine 214 may request clarification about the command before executing the commands in the real world.

In yet another example, a user may command the HMI system 110 to use a slang term or an inappropriate name to refer to the user. The HMI system 110 disclosed herein will cause the AI to respond to the user with the slang term/inappropriate name in the virtual environment and virtual consequences will be identified. For example, the usage of the slang term/inappropriate name by the HMI system may cause a virtual consequence of bystanders gasping or otherwise expressing disapproval. The virtual consequences would be determined by the self learning reasoning engine to be negative, and, in response, the self learning reasoning engine will prevent the AI from executing in response to the command in the real world.

In some examples, the response, when executed in the real world, causes real world consequences. In some such examples, the real world consequences are captured by one or more of the user input devices 125 (see FIG. 1), obtained by the HMI data capturer 210, and interpreted by the example HMI data interpreter 212. The HMI data interpreter 212 determines that the captured information is to be treated as a real world consequence instead of more user input (to which a response should be generated). In some such examples, the HMI data interpreter 212 supplies the real world consequences to the real world feedback register 410. The AI trainer 420 then uses the real world consequences to train the AI. The AI trainer 420 may operate in example HMI systems 110 in which the AI is self-learning. In addition, the real world consequences are supplied to the HMI model trainer 320 (see FIG. 3) for use in training the model of human interactions. In some examples, information collected at the user input devices 125 can be interpreted by the HMI data interpreter 212 to include both real world consequences and user input to which a response is to be generated. In some such examples, the information collected at the input devices can be stored in both the real world feedback register 410 and in the command/question register 405.

When the example virtual consequences evaluator 415 determines that the virtual consequences are negative, to avoid a negative interaction in the real (non-virtual) world, the example AI actuator 425 does not cause the AI to be executed within the example non-virtual execution environment 222. Instead, the virtual consequences evaluator 415 notifies the clarification requestor 430 which responds by causing the output devices controller 226 to: 1) ask the user for additional input, 2) ask the user to clarify, 3) inform the user that a response cannot be generated, etc.

While an example manner of implementing the example human machine interface system 110 of FIG. 1 is illustrated in FIGS. 2, 3, and 4, one or more of the elements, processes and/or devices illustrated in FIGS. 2, 3, and 4, may be combined, divided, re-arranged, omitted, eliminated and/or implemented in any other way. Further, the example still image and/or video sensor input port 202, the example keyboard input port 204, the example microphone input port 206, the example wearable input port 208, the example HMI data capturer 210, the example HMI data interpreter 212, the example self learning reasoning engine 214, the example HMI model builder 216, the example virtual execution environment 218, the example artificial intelligence (AI) loader 220, the example AI storage 221, the example non-virtual execution environment 222, the example output devices controller 226, the example output devices 227, the example text based source library 228, the example video based source library 230, the example source miner 305, the example model generator 310, the example model executor 315, the example model trainer 320, the example command/question register 405, the example real world feedback register 410, the example virtual consequences evaluator 415, the example artificial intelligence (AI) trainer 420, the example AI actuator 425, the example clarification requestor 430, and/or, more generally, the example human machine interface system 110 of FIG. 1 may be implemented by hardware, software, firmware and/or any combination of hardware, software and/or firmware. Thus, for example, any of the example still image and/or video sensor input port 202, the example keyboard input port 204, the example microphone input port 206, the example wearable input port 208, the example HMI data capturer 210, the example HMI data interpreter 212, the example self learning reasoning engine 214, the example HMI model builder 216, the example virtual execution environment 218, the example artificial intelligence (AI) loader 220, the example AI storage 221, the example non-virtual execution environment 222, the example output devices controller 226, the example output devices 227, the example text based source library 228, the example video based source library 230, the example source miner 305, the example model generator 310, the example model executor 315, the example model trainer 320, the example command/question register 405, the example real world feedback register 410, the example virtual consequences evaluator 415, the example artificial intelligence (AI) trainer 420, the example AI actuator 425, the example clarification requestor 430 and/or, more generally, the example human machine interface system 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, example still image and/or video sensor input port 202, the example keyboard input port 204, the example microphone input port 206, the example wearable input port 208, the example HMI data capturer 210, the example HMI data interpreter 212, the example self learning reasoning engine 214, the example HMI model builder 216, the example virtual execution environment 218, the example artificial intelligence (AI) loader 220, the example AI storage 221, the example non-virtual execution environment 222, the example output devices controller 226, the example output devices 227, the example text based source library 228, the example video based source library 230, the example source miner 305, the example model generator 310, the example model executor 315, the example model trainer 320, the example command/question register 405, the example real world feedback register 410, the example virtual consequences evaluator 415, the example artificial intelligence (AI) trainer 420, the example AI actuator 425, and/or the example clarification requestor 430 is/are hereby expressly defined to include a non-transitory computer readable storage device or storage disk such as a memory, a digital versatile disk (DVD), a compact disk (CD), a Blu-ray disk, etc., including the software and/or firmware. Further still, the example human machine interface system 110 of FIG. 1 may include one or more elements, processes and/or devices in addition to, or instead of, those illustrated in FIGS. 2, 3 and/or 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
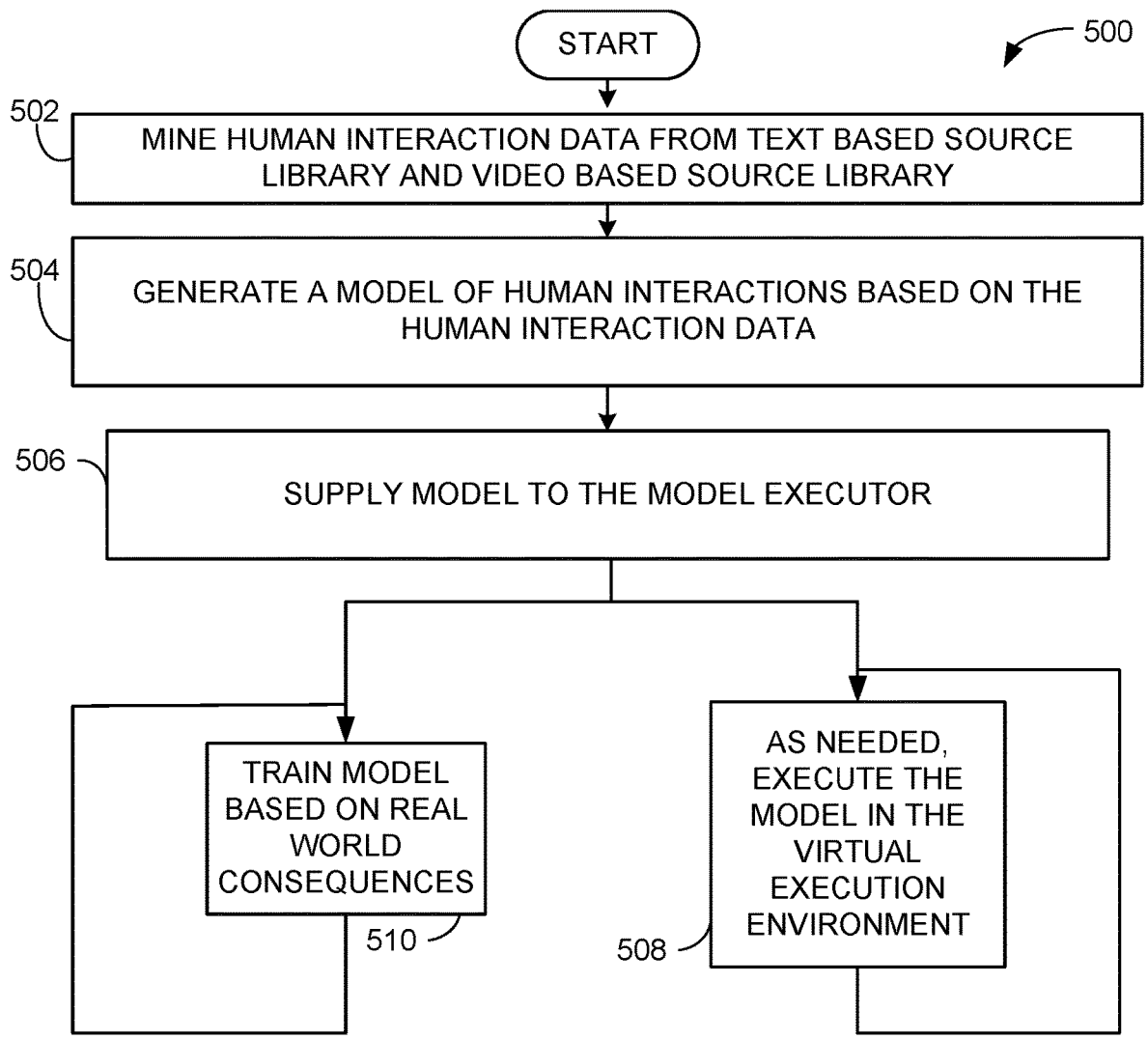
FIG. 5 is a flowchart representative of example machine readable instructions which may be executed to implement the example HMI model builder of FIG. 2 and FIG. 3.
Figure 6A:
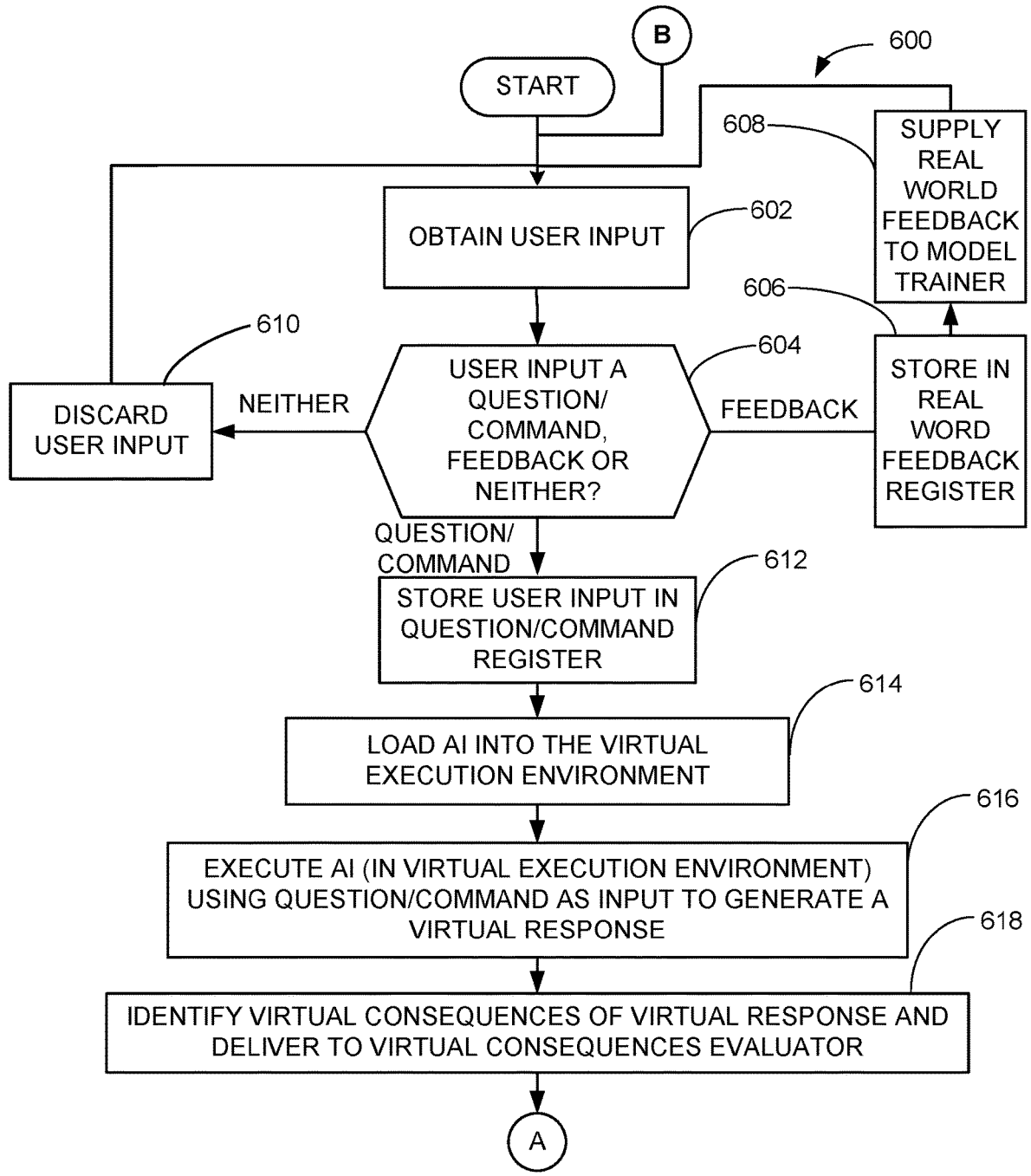
FIG. 6A and FIG. 6B include a flowchart representative of example machine readable instructions which may be executed to implement the example human machine interface system of FIG. 1, FIG. 2, FIG. 3 and FIG. 4.
Figure 6B:
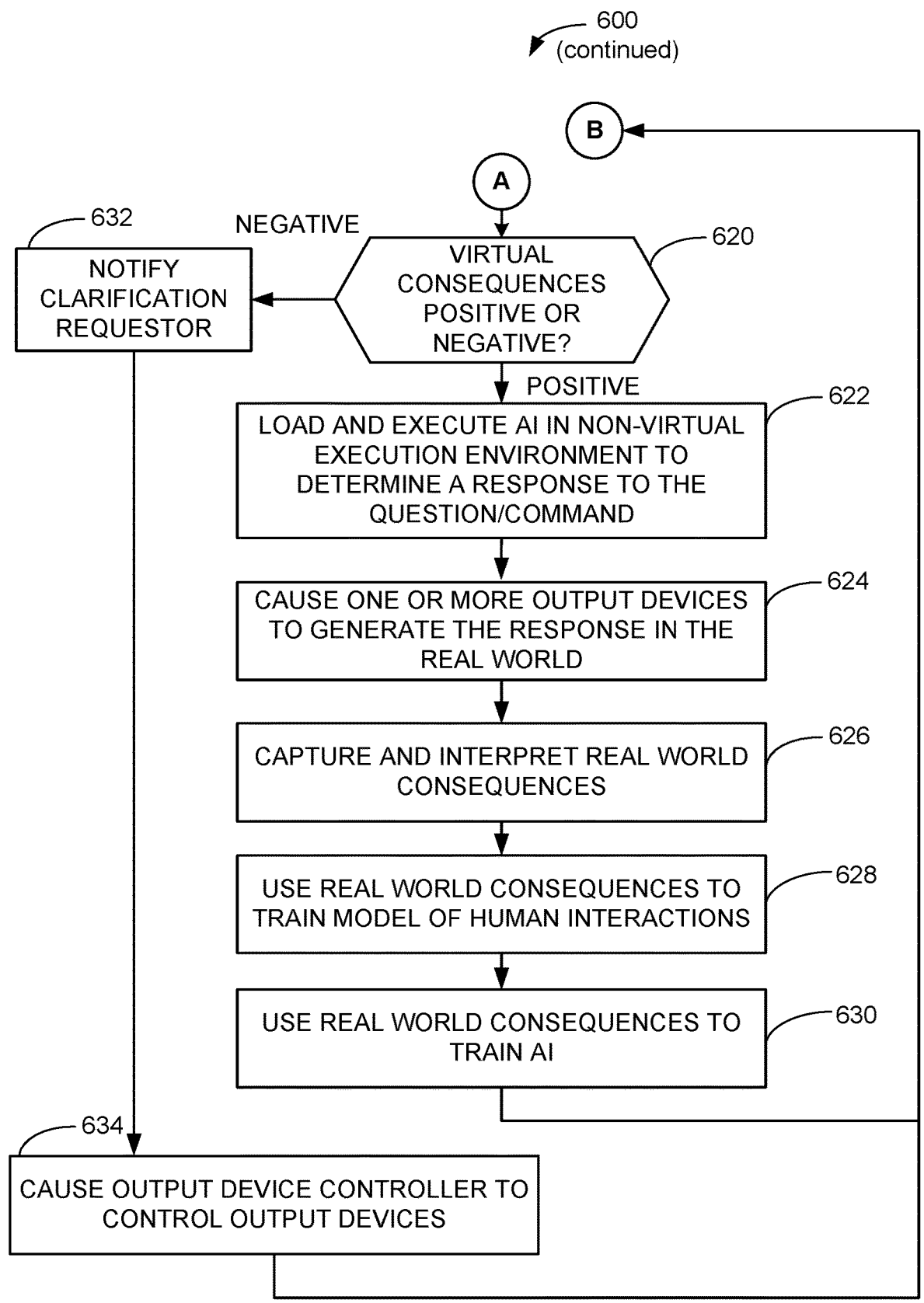

Flowcharts representative of example hardware logic, machine readable instructions, hardware implemented state machines, and/or any combination thereof for implementing the human machine interface system 110 of FIG. 1 and FIG. 2 are shown in FIGS. 5 and 6. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowchart illustrated in FIG. 5 and FIGS. 6A and 6B, many other methods of implementing the example human machine interface system 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. In some examples, all or some of the virtual execution of the AI within the virtual execution environment can occur using an FPGA (field programmable gate array).

As mentioned above, the example processes of FIGS. 5, 6A and 6B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program 500 of FIG. 5 includes block 502 at which the source miner 305 of the example HMI model builder 216 mines information from the example text based source library 228 and the example video based source library 230. In some examples, the source miner 305 tags dialogs/interactions to indicate whether the sources of the dialogs/interactions are associated with a particular genre (e.g., young adult, socially conservative, science fiction, suspense, etc.). The mined information is supplied to the example model generator 310 which uses the information to generate a model of human interactions (block 504). In some examples, when generating the model, the model generator 310 analyzes the dialogs/interactions extracted from the text content and the video content to determine whether the dialog/interactions are intended to be humorous, sarcastic, snide, condescending, etc. Additionally, the model generator 310 can use metadata extracted from on line reviews of the text and/or the video content sources to aid in the analysis of the text and video source content. In some examples, the model generator 310 is designed to give less weight to video content and/or text content that is designated as being comedic so that exaggerated scenes that are included for entertainment value are not used as a measure of appropriate/suitable human behavior.

The example model generator 310 supplies the model to the example model executor 315 (block 506). Thereafter, the model executor 315 can cause the model to be executed using "model in the loop" style testing within the confines of the virtual execution environment 218 (see FIG. 2) (block 508). As described further below, the model of human interaction can be used to predict consequences that will follow from a machine generated response to a user question and/or command. In some examples, the predicted consequences include predictions about how a user will respond to the machine generated response to the user question and/or command. The predicted consequences, also called virtual consequences, can include a predicted user's verbal response, a predicted user's non-verbal response (e.g., a gesture, or a facial expression), a predicted user's keyboardentered response, etc. The predicted consequences can generally be negative, positive, neutral, etc. In some examples, the model executor 315 causes the model to be executed on an as-needed basis (e.g., when predicted consequences are needed).

In some examples, the example model trainer 320 uses information about real world consequences (e.g., a user's reaction) of outputs generated by the human machine interface system 110 (e.g., by any of the output devices 227 (see FIG. 2)) to train the model (block 510). In some such examples, a user's reaction to an output generated by the human machine interface system 110 is captured/detected using one or more of the user input devices 125, and/or the wearable device 130. The captured user's reaction can include a verbal response and/or a non-verbal response (e.g., a gesture, or a facial expression). In some examples, the model is generated using artificial intelligence and the model trainer 320 trains the model using artificial intelligence training techniques. As illustrated in the program 500 of FIG. 5, the training of the model and the execution of the model can occur repeatedly as needed. Also, the training of the model and the execution of the model can occur at a same time. Training the model based on a user's reaction to an actual output includes changing a manner in which the simulated environment will respond to a virtual output.

The program 600 of FIG. 6 includes a block 602 at which a user input received at any of the example still image and/or video sensor input port 202, the example keyboard input port 204, the example microphone input port 206, the example wearable input port 208 is obtained by the example HMI data capturer 210 and then delivered to the example HMI data interpreter 212. The HMI data interpreter 212 determines whether the user input is to be treated as a question and/or command, whether the user input is to be treated as real world feedback, or whether the input is neither and can be ignored/discarded (block 604).

When the user input is determined to include real world feedback information, the HMI data interpreter 212 causes the information to be stored in the real world feedback register 410 (see FIG. 4) of the example self learning reasoning engine 214 (see FIG. 2 and FIG. 4) (block 606). The real world feedback information can then be accessed by and/or supplied to the model trainer 320 (block 608) for use in training the model as described above with respect to the program 500 of FIG. 5. After the information is supplied/accessed by the model trainer 320, the program 600 returns to the block 602 and blocks subsequent thereto, as described above.

In some examples, when the user input is determined to be neither real world feedback nor a command/question, the example HMI data interpreter 212 causes the user input to be discarded/ignored (block 610). When the user input information is determined to include a question and/or a command, the HMI data interpreter 212 causes the user input information to be stored in the command/question register 410 (see FIG. 4) (block 612). The AI actuator 425 responds to the placement of the question/command information in the question/command register 405 by causing the AI loader 220 (see FIG. 2) to load the AI stored in the AI storage 221 (see FIG. 2) into the virtual execution environment 218 (see FIG. 2) (block 614). In addition, the AI actuator 425 causes the AI to execute, in the virtual execution environment 218, using a copy of the question/command information as input (block 616). The AI is executed in the virtual execution environment 218 using the "software in the loop" (SIL) testing technique. Further, the SIL testing of the AI is conducted within the simulated environment/model generated by the HMI model builder 216 (see FIG. 2 and FIG. 3) through the use of the "model in the loop" (MIL) testing techniques. Executing the AI within the simulated environment causes a virtual response to the question/command to be generated. In some examples, the virtual response generated by execution of the AI within the virtual execution environment 218 represents a manner in which the human machine interface system 110 would respond to the question/command in the real world. Within the simulated environment (based on the model of human interaction generated by the HMI model builder 216) one or more virtual consequences that follow from the virtual response are identified and delivered to the example virtual consequences evaluator 415 (see FIG. 4) of the example self learning reasoning engine 214 (see FIG. 2 and FIG. 4) (block 618).

In some examples, the example virtual consequences evaluator 415 determines whether the virtual consequences are positive or negative (block 620). When the example virtual consequences evaluator 415 determines the virtual consequences are positive, the virtual response to the question/command is appropriate for the real world. As a result, the AI actuator 425 causes the AI loader 220 (see FIG. 2) to load the AI stored in the AI storage 221 (see FIG. 2) into the non-virtual execution environment 222 (see FIG. 2) (block 622). In addition, the AI actuator 425 causes the AI to be executed within the example non-virtual execution environment 222 and supplies the question/command stored in the question/command register 405 as an input to the AI (also block 622). The execution of the AI within the non-virtual execution environment 222 causes a response to the question/command to be determined. The response is supplied to the example output device controller 226 which operates one or more output devices 227 to generate the response to the question/command (in the real world) (block 624).

In some examples, the response to the user question/command causes real-world consequences. In some such examples, the real world consequences are captured by one or more of the user input devices 125 (see FIG. 1), obtained by the HMI data capturer 210, and interpreted by the example HMI data interpreter 212 (block 626). The HMI data interpreter 212 supplies the real world consequences to the real world feedback register 410 for delivery to and/or access by the example model trainer 320 (see FIG. 3) for use in training the model of human interactions as described above with respect to FIG. 5 (block 628). In some examples, the information stored in the real world feedback register is also supplied to and/or accessed by the AI trainer 420 (see FIG. 4) and used to train the AI stored in the AI storage 221 (block 630). Training the AI can include changing a manner in which the AI will respond to a user input based on the real world feedback.

When the example virtual consequences evaluator 415 determines that the virtual consequences are negative, the virtual response to the user question/command is not appropriate for the real world. To avoid a negative interaction in the real (non-virtual) world, the AI actuator 425 does not cause the AI to be executed within the example non-virtual execution environment 222. Instead, the virtual consequences evaluator 415 notifies the example clarification requestor 430 which can cause the output devices controller 226 to: 1) cause a speaker and/or display included among the output devices 227 (see FIG. 2) to ask the user for additional input, 2) cause the speaker and/or display to ask the user to clarify, 3) cause the speaker and/or display to inform the user that a response cannot be generated, etc. (block 634). In some examples, when the virtual consequences evaluator 415 determines the virtual consequences are negative, the clarification requester 430 causes the input command/question to be ignored such that no response to the question/command is generated by the human machine interface system 110. The program 600 then returns to the block 602 to respond to a next user input.

Figure 7:
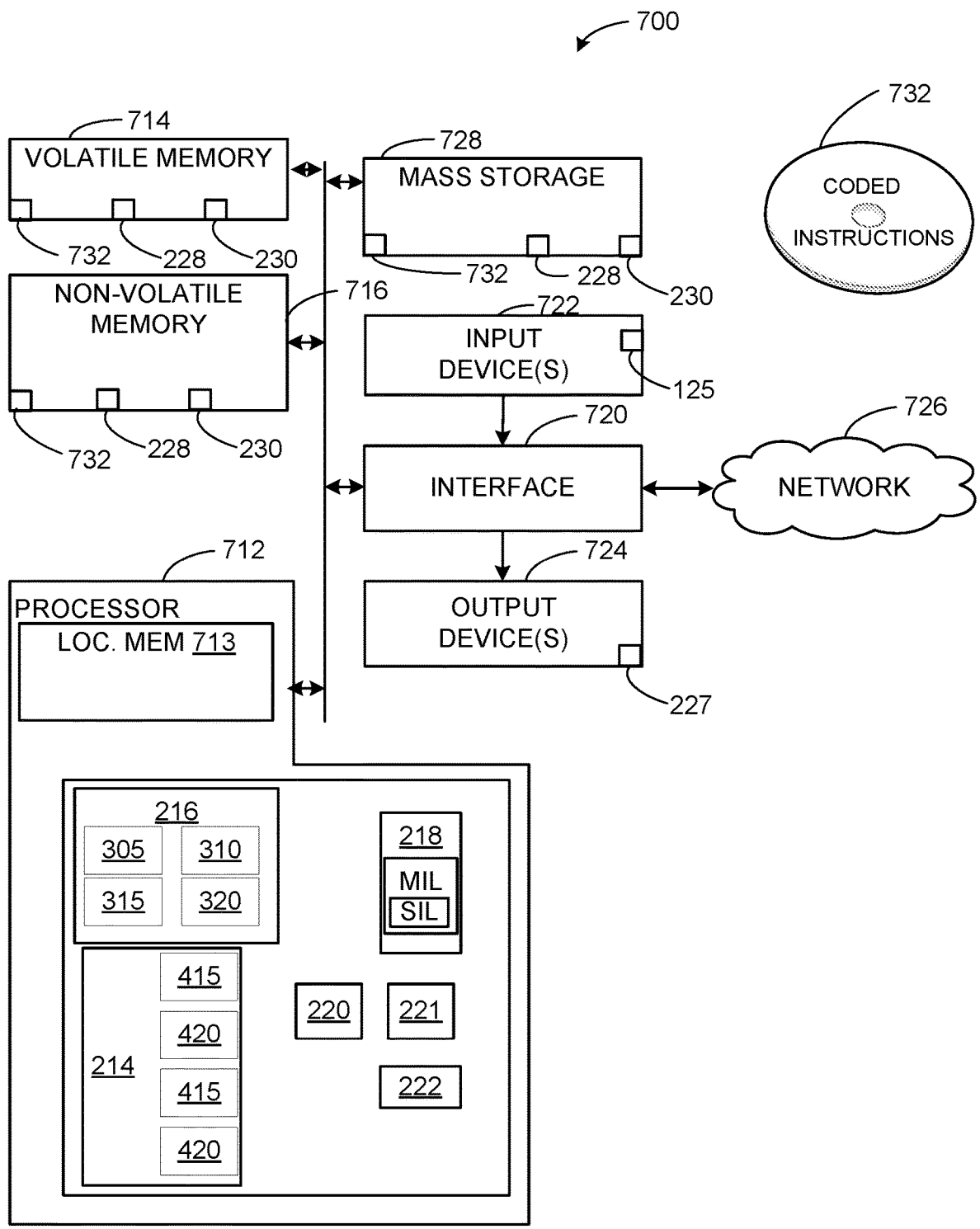
FIG. 7 is an example processing platform structured to execute the instructions of FIG. 5, FIG. 6A, and/or 6B to implement the example human machine interface system of FIG. 1, FIG. 2, FIG. 3, and/or FIG. 4.

FIG. 7 is a block diagram of an example processor platform 700 structured to execute the instructions of FIGS. 5, 6A, and 6B to implement the human machine interface system 110 of FIG. 1 and FIG. 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example HMI model builder 216, the example self learning reasoning engine 214, the example AI loader 220, the example HMI data interpreter 212, the example HMI data capturer 210, the example virtual execution environment 218, the example non-virtual execution environment 222, the example output devices controller 226, the example source miner 305, the example model generator 310, the example model executor 315, the example model trainer 320, the example virtual consequences evaluator 415, the example AI trainer 420, the example AI actuator 425, and the example clarification requestor 430.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller. The volatile memory and the non-volatile memory can be used to implement the example text based source library 228 and/or the example video based source library 230.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) 722 can be used to implement, for example, the user input devices 125 of FIG. 2 and can include an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be used to implement the output devices 227 (of FIG. 2) and can include display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or a speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 5, 6A and 6B may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that inject common sense reasoning into a human machine interface system. Disclosed methods, apparatus and articles of manufacture improve the efficiency of using a human machine interface system of a computing device by virtually executing artificial intelligence in a virtual environment so that consequences of responding to a user question/command can be evaluated virtually before any real world response is generated. Further, when virtual consequences of a response to a user command/question are inappropriate/negative, the system can forego generating the response in the real world. As a result, human machine interface systems, methods, articles of manufacture, and apparatus disclosed herein are more user-friendly and more helpful to the user. Disclosed methods, apparatus and articles of manufacture are accordingly directed to one or more improvement(s) in the functioning of a computer.

The following further examples are disclosed herein.

Example 1 is a human machine interface system that includes an actuator to cause artificial intelligence to execute in a virtual execution environment to generate a virtual response to a user input and that also includes a virtual consequence evaluator to evaluate a virtual consequence that follows from the virtual response. The virtual consequence is generated by executing a model of human interactions. The system further includes an output device controller to cause an output device to perform a non-virtual response to the user input when the virtual consequence evaluator evaluates the virtual consequence as positive.

Example 2 includes the human machine interface system of Example 1. In Example 2, the actuator is to, when the virtual consequence evaluator evaluates the virtual consequence as positive, cause the artificial intelligence to execute in a non-virtual execution environment to generate the non-virtual response to the user input.

Example 3 includes the human machine interface system of Example 1. In example 3, the actuator is to cause the artificial intelligence to execute in a virtual execution environment via a software in the loop test.

Example 4 includes the human machine interface system of Example 3 and further includes a human machine interface builder having a source miner to extract human interaction data from sources, a model generator to generate the model of human interactions based on the human interaction data, a model trainer to train the model of human interactions based on human reaction data captured via an input device, and a model executor to cause the model of human interactions to execute in the virtual execution environment in a model in the loop test. The artificial intelligence executes within the model in the loop test.

Example 5 includes the human machine interface system of Example 4 and further includes a text based source library to contain text based human interaction information, a video based source library to contain video based human interaction information. In Example 5, the source miner extracts the human interaction information from the text based source library and the video based source library.

Example 6 includes the human machine interface system of Example 5. In Example 6, the text based human interaction information is from one or more of books, articles, screenplays, movie scripts, television scripts, and plays, and the video based human interaction information is from one or more of television shows, videos, and movies. In Example 6, the model generator analyzes the text based human interaction information and the video based human interaction information to identify human interactions and dialogs and context of the human interactions and dialogs.

Example 7 includes the human machine interface system of Example 1, further including a clarification requestor to cause the output device controller to cause an output device to request clarification from the user when the virtual consequence evaluator evaluates the virtual consequence as negative.

Example 8 includes the human machine interface system of Example 1. In Example 8, the human machine interface system ignores the user input when the virtual consequence evaluator evaluates the virtual consequence as negative.

Example 9 includes a non-transitory machine readable medium including machine readable instructions that, when executed, cause a processor to at least generate a virtual response to a user input, determine virtual consequences that follow from the virtual response, and, based on an evaluation of whether the virtual consequences are positive or negative, cause an output device to output a response to the user input.

Example 10 includes the non-transitory machine readable medium of Example 9. In Example 10, the instructions cause the processor to generate the evaluation of whether the virtual consequences that follow from the virtual response are positive or negative.

Example 11 includes the non-transitory machine readable medium of Example 9. In Example 11, the instructions cause the processor to generate the virtual response to the user input by executing artificial intelligence in a virtual execution environment using loop testing.

Example 12 includes the non-transitory machine readable medium of Example 11. In Example 12, the instructions cause the processor to execute the artificial intelligence using the loop testing within a model of human interactions.

Example 13 includes the non-transitory machine readable medium of Example 12. In Example 13, the instructions cause the processor to generate the model of human interactions based on a text source library and a video source library.

Example 14 includes the non-transitory machine readable medium of Example 12. In Example 14, the instructions cause the processor to determine the virtual consequences by executing the artificial intelligence in the virtual execution environment using the loop testing.

Example 15 includes the non-transitory machine readable medium of Example 9. In Example 15, the instructions cause the processor to cause the output device to, when the evaluation indicates the virtual consequences are positive, output the response to the user input, and, when the evaluation indicates the virtual consequences are negative, at least one of 1) ignore the user input, or 2) request clarification from the user.

Example 16 is a method to operate a human machine interface that includes generating, by executing an instruction with a processor within a virtual execution environment, a virtual response to a user input, determining, by executing an instruction with the processor within the virtual execution environment, virtual consequences that follow from the virtual response, and, based on an evaluation of whether the virtual consequences are positive or negative, causing an output device to generate a response to the user input.

Example 17 includes the method of Example 16 and further includes generating the evaluation of whether the virtual consequences are positive or negative.

Example 18 includes the method of Example 16. In Example 18, generating the virtual response to the user input includes executing artificial intelligence in the virtual execution environment using software in the loop testing.

Example 19 includes the method of Example 16, and further includes determining the virtual consequences that follow from the virtual response by executing artificial intelligence within a simulated environment. In Example 19, the simulated environment is based on a model of human interactions.

Example 20 includes the method of Example 19, and further includes generating the model of human interactions using a text-based source library and a video-based source library.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system comprising:
   interface circuitry to obtain a user input;
   computer readable instructions; and
   programmable circuitry to be programmed by the instructions an actuator to:
   execute artificial intelligence to generate a virtual response to the user input;
   process a model to generate a virtual consequence to follow from the virtual response;
   evaluate the virtual consequence; and
   cause an output device to perform a non-virtual response to the user input based on the virtual consequence evaluating as positive; and
   cause the output device to ignore the user input based on the virtual consequence evaluating as negative.

2. The system of claim 1, wherein the programmable circuitry is to execute the instructions in a virtual execution environment.

3. The system of claim 2, further including:
a source miner to extract human interaction data from sources;
a model generator to generate the model based on the human interaction data;
a model trainer to train the model based on human reaction data captured via an input device; and
wherein the programmable circuitry is to process the model in the virtual execution environment in a loop test.

4. The system of claim 3, further including:
a text based source library to contain text based human interaction information; and
a video based source library to contain video based human interaction information, the source miner to extract the human interaction information from the text based source library and the video based source library.

5. The system of claim 3, wherein the artificial intelligence includes:
a feedback register to store the human reaction data;
a trainer to train the artificial intelligence based on the human reaction data;
an input register to store the user input;
an actuator to cause the artificial intelligence to generate the virtual response based on a copy of the user input;
a virtual consequence evaluator to evaluate the virtual consequence that is to follow from the virtual response;
a clarification requestor to cause an output device controller to respond to the user input; and
wherein the programmable circuitry is to execute the artificial intelligence in the virtual execution environment in the loop test.

6. The system of claim 4, wherein the text based human interaction information is from one or more of books, articles, screenplays, movie scripts, television scripts, or plays, the video based human interaction information is from one or more of television shows, videos, or movies, and the model generator is to analyze the text based human interaction information and the video based human interaction information to identify human interactions and dialogs and to identify contexts of the human interactions and dialogs.

7. The system of claim 1, wherein the programmable circuitry is to cause the output device to at least one of 1) request additional input from a user, 2) request clarification from the user, or 3) inform the user that a response cannot be generated when the virtual consequence evaluates as negative.

8. A non-transitory machine readable medium comprising machine readable instructions that, when executed, cause at least one processor to at least:
generate a first virtual response to a first user input based on artificial intelligence;
determine a first virtual consequence of the first virtual response is negative;
at least one of 1) ignore the first user input, 2) request clarification from a user, or 3) request additional information from the user;
generate a second virtual response to a second user input;
determine a second virtual consequence of the second virtual response is positive; and
cause an output device to output a non-virtual response based on the second virtual response.

9. The non-transitory machine readable medium of claim 8, wherein the instructions cause the at least one processor to generate the first virtual response to the first user input by executing artificial intelligence in a virtual execution environment using loop testing.

10. The non-transitory machine readable medium of claim 9, wherein the instructions cause the at least one processor to execute the artificial intelligence using the loop testing within a model of human interactions.

11. The non-transitory machine readable medium of claim 10, wherein the instructions cause the at least one processor to generate the model of human interactions based on a text source library and a video source library.

12. The non-transitory machine readable medium of claim 10, wherein the instructions cause the at least one processor to determine the first virtual consequence by executing the artificial intelligence in the virtual execution environment using the loop testing.

13. A method to operate a human machine interface, the method comprising:
generating, by executing an instruction with processor circuitry, a virtual response to a user input;
determining, by executing an instruction with the processor circuitry, a virtual consequence of the virtual response;
in response to the virtual consequence evaluating as negative, ignoring the user input; and
in response to the virtual consequence evaluating as positive, causing an output device to output a non-virtual response to the user input, the non-virtual response generated by artificial intelligence.

14. The method of claim 13, further including determining, with the artificial intelligence, that the virtual consequence evaluates as positive.

15. The method of claim 13, wherein the generating of the virtual response to the user input includes executing the artificial intelligence in a virtual execution environment using software in loop testing.

16. The method of claim 13, further including determining, with the artificial intelligence, that the virtual consequence evaluates as positive by executing the artificial intelligence within a simulated environment, the simulated environment based on a model of human interactions.

17. The method of claim 16, further including generating the model of human interactions using a text-based source library and a video-based source library.

* * * * *

UNITED STATES PATENT AND TRADEMARK OFFICE
CERTIFICATE OF CORRECTION

PATENT NO. : 11,762,451 B2
APPLICATION NO. : 16/147663
DATED : September 19, 2023
INVENTOR(S) : Moustafa et al.

Page 1 of 1

It is certified that error appears in the above-identified patent and that said Letters Patent is hereby corrected as shown below:

In the Claims

Column 16, Line 57 (Claim 1), delete "an actuator"

Column 16, Line 62 (Claim 1), delete "and"

Signed and Sealed this
Thirty-first Day of October, 2023

Katherine Kelly Vidal
*Director of the United States Patent and Trademark Office*